United States Patent [19]

VanRens

[11] Patent Number: 4,880,047
[45] Date of Patent: * Nov. 14, 1989

[54] LOST FOAM TRANSFER PASSAGE CAVITY CONSTRUCTION

[75] Inventor: Russell J. VanRens, Milwaukee, Wis.

[73] Assignee: Outboard Marine Corporation, Waukegan, Ill.

[ * ] Notice: The portion of the term of this patent subsequent to Oct. 10, 2006 has been disclaimed.

[21] Appl. No.: 202,489

[22] Filed: Jun. 3, 1988

[51] Int. Cl.⁴ .............................................. B22C 7/02
[52] U.S. Cl. ........................................ 164/45; 164/34; 164/246; 164/342; 164/340; 249/63; 249/144; 425/DIG. 12; 425/DIG. 58
[58] Field of Search ....................... 164/34, 35, 36, 45, 164/137, 245, 246, 249, 339, 340, 342; 249/61, 62, 63, 144, 145; 425/DIG. 12, DIG. 58

[56] References Cited

U.S. PATENT DOCUMENTS

| Re. 31,488 | 1/1984 | Trumbauer | 164/34 |
| 4,243,093 | 1/1981 | Nieman | 164/34 |
| 4,632,169 | 12/1986 | Osborn et al. | 164/45 |
| 4,640,333 | 2/1987 | Martin et al. | 164/246 |
| 4,657,063 | 4/1987 | Morris | 164/45 |
| 4,691,754 | 9/1987 | Trumbauer | 164/34 |
| 4,693,861 | 9/1987 | Lapeyre | 249/144 |
| 4,721,149 | 1/1988 | Hesterberg et al. | 164/244 |

Primary Examiner—Richard K. Seidel
Attorney, Agent, or Firm—Michael, Best & Friedrich

[57] ABSTRACT

Disclosed herein is a die member for forming a lost foam pattern for casting a cylinder block having a cylindrical bore with an axis and a helical transfer passage including a first portion permitting die member separation in a direction along the axis of the cylindrical bore and a second undercut portion preventing one-piece die member separation in the direction along the axis of the cylindrical bore, which die member comprises a projection forming a first cavity corresponding to a first part of the first portion of the transfer passage, and a core carried by the die member and movable relative to the die member between an extended position forming a second cavity corresponding to a second part of the first portion of the transfer passage and the undercut portion of the transfer passage, and a retracted position affording separation of said core through the second part of the first portion of the transfer passage and in common with separation of said projection from the first portion of the transfer passage in the direction along the axis of the cylindrical bore.

6 Claims, 1 Drawing Sheet

LOST FOAM TRANSFER PASSAGE CAVITY CONSTRUCTION

RELATED APPLICATIONS

This application is related to my following co-pending applications filed of even date herewith:

U.S. Ser. No. 202,970 Filed: June 3, 1988 Entitled "Lost Foam Pattern Assembly For V-Block Engine" (Attorney docket No. 72014/8780-8)

U.S. Ser. No. 202,693 Filed: June 3, 1988 Entitled "Lost Foam Casting Assembly" (Attorney docket No. 72014/8560-1)

U.S. Ser. No. 202,876 Filed: June 3, 1988 Entitled "Die Member For Forming A Lost Foam Pattern" (Attorney docket No. 72014/8440-0)

U.S. Ser. No. 202,212 Filed: June 3, 1988 Entitled "Lost Foam Engine Block Pattern" (Attorney docket No. 72014/8400-1)

BACKGROUND OF THE INVENTION

The invention relate to die casting of lost foam patterns for use in casting an engine block for a two stroke engine. The invention also relates to die casting of such engine blocks which include a cylinder bore and a helical transfer passage which, because of the helical or inclined relation to the axis of the cylinder, includes an undercut portion which generally prevents one-piece die member removal in a direction along the axis of the cylinder. Still further, the invention relates to die members for forming such transfer passages.

In the past, formations with under cut areas were formed by a core which, in general, formed a major portion of the formation including the under cut area and which was pulled or removed entirely from the die cast lost foam pattern along an axis extending parallel to the direction of the under cut and at a slight angle to the axis of the supporting die member before pulling or withdrawal of the supporting die member. Such removal involved a relatively long stroke length which adds to the mold size, and to the precision of core location, and to the cost of the die assembly, as well as increasing the die casting cycle time.

Attention is directed to the following prior U.S. Pat. Nos.:

| | | |
|---|---|---|
| 4,243,093 | Neiman, J. R. | January 6, 1981 |
| 4,632,169 | Osborn, H. L. | December 30, 1986 |
| 4,640,333 | Martin, et al. | February 3, 1987 |
| 4,657,063 | Morris, R. L. | April 14, 1987 |
| 4,691,754 | Trumbauer, et al. | September 8, 1987 |
| 4,721,149 | Hesterberg, et al. | January 26, 1988 |
| Re.31,488 | Trumbauer | January 10, 1984 |

Particular attention is directed to the Osborn U.S. Pat. No. 4,632,169 which discloses a three piece lost foam pattern. In this reference, the transfer passage portion in the middle piece identified by the numeral 18 in FIG. 2 of the Osborn patent does not extend helically with respect to the cylinder axis.

SUMMARY OF THE INVENTION

The invention provides a die member for forming a lost foam pattern for casting a cylinder block having a cylindrical bore with an axis and a helical transfer passage including a first portion permitting die member separation in a direction along the axis of the cylindrical bore and a second undercut portion preventing one-piece die member separation in the direction along the axis of the cylindrical bore, which die member comprises a projection forming a first cavity corresponding to a first part of the first portion of the transfer passage, and a core carried by the die member and movable relative to the die member between an extended position forming a second cavity corresponding to a second part of the first portion of the transfer passage and the undercut portion of the transfer passage, and a retracted position in which the core affords removal of the die member from the pattern in the direction along the axis of the cylindrical bore.

The invention also provides a die member for forming a lost foam pattern for casting a cylinder block having a cylindrical bore with an axis and a helical transfer passage including a first portion permitting die member separation in a direction along the axis of the cylindrical bore and a second undercut portion preventing one-piece die member separation in the direction along the axis of the cylindrical bore, which die member is relatively movable between an extended position forming the transfer passage cavity and a retracted position separated from the transfer passage cavity, which die member comprises a projection forming a first cavity corresponding to a first part of the first portion of the transfer passage, and a core carried by the die member and moveable transversely of the axis of the cylindrical bore and relative to the die member between an extended position forming a second cavity corresponding to a second part of the first portion of the transfer passage and the undercut portion of the transfer passage, and a retracted position in which the core affords removal of the die member from the pattern in the direction along the axis of the cylindrical bore.

The invention also provides a method of making a lost foam pattern for an engine block having a cylinder and a helical transfer passage which extends axially of the cylinder and which includes an undercut portion, said method comprising the steps of employing a die member to form a portion of the cylinder and a portion of the helical transfer passage, and employing a core supported by and movable relative to the die member between an extended position forming the undercut portion of the helical transfer passage and a retracted position clear of the undercut portion.

Other features and advantages of the invention will become apparent to those skilled in the art upon review of the following detailed description, claims and drawings.

Figure 1:
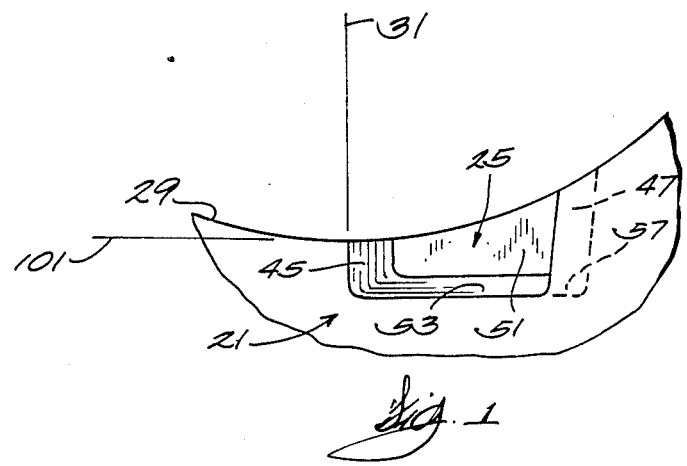
FIG. 1 is a fragmentary view taken transversely of the cylinder bore of a lost foam pattern piece forming one part of a lost foam pattern for a two-stroke engine.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways.

Also, it is to be understood that the phraseology and terminology used herein is for the purpose of description and should not be regarded as limiting.

GENERAL DESCRIPTION

Shown fragmentarily in the drawings is one piece or portion 21 of a multi-piece lost foam pattern (not otherwise shown) for sand casting a two-stroke engine block (not shown) by the lost foam sand casting process.

Figure 2:
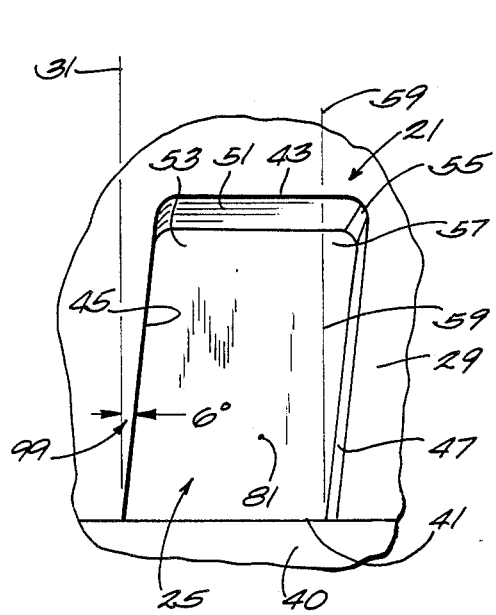
FIG. 2 is a fragmentary elevational view of one piece or portion of a lost foam pattern for a two-stroke engine block.

The pattern piece 21 includes, as seen in FIGS. 1 and 2, a cavity 25 which, during the casting process, is filled with sand and which provides a transfer passage (not otherwise shown) for the engine block. The pattern piece 21 also includes a cylindrical bore 29 which is formed about an axis 31, which provides a similar cylindrical bore in the engine block, and which communicates with the transfer passage cavity 25.

During the pattern piece die casting process, the Pattern piece 21 is formed between a first die member 40 (See FIG. 3) and a second die member (not shown) which open and close in directions along the axis 31 of the cylindrical bore 29 as is well known in the art.

The transfer passage cavity 25 includes an entry end 41 and a remote or outer end 43. The entry end 41 and the remote or outer end 43 are connected by side walls 45 and 47. The transfer passage cavity 25 is also defined by an axially outer wall 51 at the outer or remote end 43 and by a radially outer wall 53 connecting the side walls 45 and 47 and the axially outer wall 51. As shown, the axially outer wall 51 is inclined toward the cylinder bore 29. The side wall 48 extends radially and the side wall 47 is slightly inclined, as shown in FIGS. 1 and 2, and defines, with the axially outer wall 51, a corner 55 in the transfer passage cavity 25.

The transfer passage cavity 25 extends at a slight incline to the axis 31 of the cylindrical bore 29, i.e., is helically disposed relative to the axis 31 of the cylindrical bore 29, and creates, within the transfer passage cavity 25, an undercut portion, or region, or area 57 which is located to the right of a line 59 and which, in the absence of the invention disclosed herein, would prevent separation of the pattern piece 21 and a one-piece die member creating the transfer passage cavity 25. Consequently, a one-piece die member and pattern piece 21 could not readily be separated from each other, either by withdrawal of the one-piece die member from the pattern piece 21 or by ejection of the pattern piece 21 from the one-piece die member. Additional other features of the pattern are provided incident to separation of the pattern and die assembly in directions along the axis of the cylinder bore 29.

Figure 3:
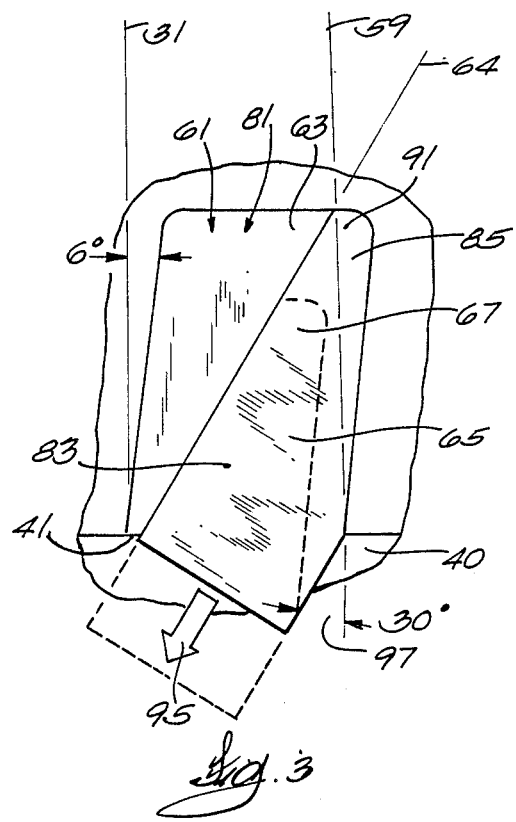
FIG. 3 is a view similar to FIG. 2 and illustrating the relationship of the lost foam pattern piece and the die member forming the lost foam pattern piece.

In order to overcome the problem referred to above, the die member 40 is provided with a projecting portion 61 which serves to form a part 63 of the transfer passage cavity 25, i.e., the part to the left of the line 64 in FIG. 3. In addition, the die member 40 is provided with a movable core 65 which serves to form a remaining part 67 of the transfer passage cavity 25, i.e., the part to the right of the line 64 in FIG. 3, and which is movable relative to the die member 40 between extended and retracted positions. In this regard, the transfer passage cavity 25 can be thought of (See FIG. 2) as including a first or separable portion 81 (i.e., separable from the die member 40) which portion 81 is located to the left of the line 59 and includes the part 63 and a first segment 83 of the part 67 (i.e., the segment to the left of the line 59 and to the right of the line 64) and which will accommodate separation between the die member 40 and the pattern piece 21, and a second or undercut non-separable portion 85 which is a second segment of the part 67 (i.e., the segment to the right of the line 59) and which will not permit such separation.

Accordingly, while other constructions are thought to be possible, in the disclosed construction, the projecting portion 61 of the die member 40 forms only the part 63 of the separable portion 81 of the transfer passage cavity 25 and the core 65 forms, when in the extended position, the first segment 83 of the separable cavity portion 81 and all of the non-separable or undercut portion 85 of the transfer passage cavity 25. In the retracted position, the core 65 is partially removed from the transfer passage cavity 25 and is fully removed from the undercut portion 85 such that the projecting end 91 of the core 65 is located in the first segment of the separable portion 81 of the transfer passage cavity 25.

In order to facilitate such action, the core 65 is movable relative to the die member 40 along a rectilinear path 95 at an angle 97 relative to the axis 31 of the cylindrical bore 29 such that core movement through a relatively minor distance causes partial removal or separation of the core 65 from the transfer passage cavity 25, which partial separation includes movement of the projecting end 91 of the core 65 from the remote end 43 of the transfer cavity 25, accompanied by movement of the core 65 out of or from the undercut area or portion 57 of the transfer cavity 25 and into the no-undercut or separable portion 81 of the cavity 25 so as to thereafter permit separation or removal of the core 65 from the transfer passage cavity 25 by reason of separation of the die member 40 from the pattern piece 21 either by withdrawal of the die member 40 from the pattern piece 21 or ejection of the pattern piece 21 from the die member 40.

In order to facilitate such core movement and such withdrawal or ejection, the transfer passage cavity 25 is formed by splitting the transfer passage cavity 25, as already indicated, into the part 63 created during die casting by the die member 40 and the part 67, including the undercut area 85 and the segment 83, created by the core 65. This split extends along the line 64 which runs from the entry end 41 of the transfer passage cavity 25 to the remote end 43 of the transfer passage cavity 25 and which is parallel to the path 95 of relative movement between the core 65 and the die member 40 and thus at an angle 97 to the axis 31 of the cylindrical bore 29, with the result that the cavity part 63 formed by the projecting portion 61 of the die member 40 is a minor portion of the transfer passage cavity 25 adjacent the entry end 41, and a major portion of the transfer passage cavity 25 adjacent the remote end 43. As a consequence, the cavity part formed by the core 65 is a major portion of the transfer passage cavity 25 adjacent the entry end 41 and a minor portion of the transfer passage cavity 25 adjacent the remote end 43.

While other specific arrangements, are possible, in the disclosed construction, the helical or lead angle 99, of the transfer passage cavity 25 relative to the axis 31 of the cylindrical bore 29 is about six degrees (6°) and the angle 97 between the direction of relative movement between the die member 40 and the core 65 and the axis of the cylinder bore is about thirty degrees (30°) when measured in a plane 101 extending approximately tangentially to the cylindrical bore 29 at one side of the entry end 41 of the transfer passage cavity 25. The result is that a small core retraction stroke i.e., for example, ⅜ inch, is obtained as compared to a much longer stroke length, i.e., a stroke length of several inches.

Any suitable arrangement well known in the die casting art can be employed for causing movement of the core 65 relative to the die member 40 along the path of core movement and at a time after casting of the piece pattern 21 and before separation of the pattern piece 21 and the die member 40.

Various of the features of the invention are set forth in the following claims.

I claim:

1. A die member for forming a lost foam pattern for casting a cylinder block having a cylindrical bore with an axis and a helical transfer passage including a first portion permitting die member separation in a direction along the axis of the cylindrical bore and a second undercut portion preventing one-piece die member separation in the direction along the axis of the cylindrical bore, said die member comprising a projection forming a first cavity corresponding to a first part of the first portion of the transfer passage, and a core carried by said die member and moveable relative to said die member between an extended position forming a second cavity corresponding to a second part of the first portion of the transfer passage and the undercut portion of the transfer passage, and a retracted position in which said core affords removal of said die member from the pattern in the direction along the axis of the cylindrical bore.

2. A die member in accordance with claim 1 wherein the helical transfer passage extends at a first angle relative to the axis of the cylindrical bore, and said core is movable relative to said die member along a straight path at a second angle relative to the axis of the cylindrical bore, said second angle being greater than said first angle.

3. A die member for forming a lost foam pattern for casting a cylinder block having a cylindrical bore with an axis and a helical transfer passage including a first portion permitting die member separation in a direction along the axis of the cylindrical bore and a second undercut portion preventing one-piece die member separation in the direction along the axis of the cylindrical bore, said die member being relatively movable between an extended position forming a transfer passage cavity and a retracted position separated from the transfer passage cavity, said die member comprising a projection forming a first cavity corresponding to a first part of the first portion of the transfer passage, and a core carried by said die member and moveable transversely of the axis of the cylindrical bore and relative to said die member between an extended position forming a second cavity corresponding to a second part of the first portion of the transfer passage and the undercut portion of the transfer passage, and a retracted position in which said core affords removal of said die member from the pattern in the direction along the axis of the cylindrical bore.

4. A die member in accordance with claim 3 wherein the helical transfer passage extends at a first angle relative to the axis of the cylindrical bore, and said core is movable relative to said die member along a straight path at a second angle relative to the axis of the cylindrical bore, said second angle being greater than said first angle.

5. A method of making a lost foam pattern for an engine block having a cylinder and a helical transfer passage which extends axially of the cylinder and which includes an undercut portion, said method comprising the steps of employing a die member to form a portion of the cylinder and a portion of the helical transfer passage, and employing a core supported by and movable relative to the die member between an extended position forming the undercut portion of the helical transfer passage and a retracted position clear of the undercut portion.

6. A die member for forming a lost foam pattern for casting a cylinder block, the pattern having a cylindrical bore with an axis and a helical transfer passage including a first portion permitting die member separation in a direction along the axis of the cylindrical bore and a second undercut portion preventing one-piece die member separation from the pattern in the direction along the axis of the cylindrical bore, said die member comprising a main portion forming at least a portion of the cylindrical bore and including a projection forming a first cavity corresponding to a first part of the first portion of the transfer passage, and a core carried by said main portion and moveable relative to said main portion between an extended position in which said core forms a second cavity corresponding to a second part of the first portion of the transfer passage and the undercut portion of the transfer passage, and a retracted position in which said core affords removal of said die member from the pattern in the direction along the axis of the cylindrical bore.

* * * * *